(12) United States Patent
Chao et al.

(10) Patent No.: US 8,198,128 B2
(45) Date of Patent: Jun. 12, 2012

(54) NANO-ARRAY AND FABRICATION METHOD THEREOF

(75) Inventors: Chih-Chiang Chao, Taipei (TW);
Po-Ling Shiao, Hsinchu (TW);
Mei-Chun Lai, Tongsiao Township, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 267 days.

(21) Appl. No.: 12/628,847

(22) Filed: Dec. 1, 2009

(65) Prior Publication Data

US 2010/0120196 A1 May 13, 2010

Related U.S. Application Data

(62) Division of application No. 11/509,660, filed on Aug. 25, 2006, now Pat. No. 7,649,198.

(30) Foreign Application Priority Data

Dec. 28, 2005 (TW) ................................ 94146967 A (51) Int. Cl.
*H01L 51/40* (2006.01)
(52) U.S. Cl. .................................. 438/99; 257/E21.007
(58) Field of Classification Search ..................... 438/99, 438/780; 257/E21.007
See application file for complete search history.

(56) References Cited

U.S. PATENT DOCUMENTS

| 7,414,263 B2 * | 8/2008 | Choi et al. ........................ 257/40 |
| 7,760,435 B2 * | 7/2010 | Tormen et al. ................. 359/619 |
| 2003/0089899 A1 | 5/2003 | Lieber et al. |
| 2004/0013873 A1 | 1/2004 | Wendorff et al. |
| 2004/0126305 A1 | 7/2004 | Chen et al. |
| 2004/0188874 A1 | 9/2004 | Hikita et al. |
| 2006/0292312 A1 * | 12/2006 | Kim et al. ..................... 427/532 |

FOREIGN PATENT DOCUMENTS

| CN | 1437528 A | 8/2003 |
| DE | 101 54 756 C1 | 11/2002 |
| KR | 102003008427 A | 11/2003 |
| TW | 200512090 A | 4/2005 |

* cited by examiner

*Primary Examiner* — Quoc Hoang
(74) *Attorney, Agent, or Firm* — Birch, Stewart, Kolasch & Birch, LLP (57) ABSTRACT

The invention provides a method for fabricating a nano-array comprising the following steps. A template with a plurality of nano-holes is provided. A polymer is embossed by the template to integrally form a plurality of nano-protrusions thereon, and demolding to reveal the nano-protrusions. The nano-protrusion has a concave or convex top surface.

10 Claims, 10 Drawing Sheets

NANO-ARRAY AND FABRICATION METHOD THEREOF

CROSS-REFERENCES TO RELATED APPLICATIONS

This application is a Divisional of co-pending application Ser. No. 11/509,660, filed on Aug. 25, 2006, the entire contents of which are hereby incorporated by reference and for which priority is claimed under 35 U.S.C. §120. This nonprovisional application also claims priority under 35 U.S.C. §119(a) on Patent Application No. 94146967 filed in Taiwan on Dec. 28, 2005, the entirety of which is herein incorporated by reference.

BACKGROUND OF THE INVENTION

1. Field of the Invention

The invention relates to a fabrication method of a modification nano-array, and in particular to a fabrication method of a modifiable nano-array by embossing.

2. Description of the Related Art

Regular nano-structures having a diameter of about 100 nm has special functions, such as low-reflectivity of insect's ommateum, anti-adhering effect of inset's wing, lotus effect. In present nano-technology, the method of fabricating a polymer substrate with hydrophobic surface, anti-oil surface or low-reflective surface, comprises twice surface treatments, and is complicated and expensive. Using lithography as an example, the process of fabricating a surface with regular nano-structures is difficult and expensive as the nano-structures geometries scale down to 90 nm.

In Acta Physiol Scand, insect's ommateum with high-sensitiveness to light at night has been observed by C. G Bernhard et al (1962). Nano-structures of insect's ommateum having a diameter of less than 250 nm exhibit super-low reflectivity in wide wavelength range of light. Moth Eye Principle has been proposed in Nature (1973) by Clapham and Hutley. In Planta, Lotus effect has been observed by W. barthlott et al. There is a plurality of nano-protrusions having a diameter of less than 50 nm on the surface of lotus to obtain a self-cleaning surface due to small contact area of the nano-protrusions.

Using anodic alumina oxidation (AAO) as a template has been published in Science (2002) by M. Steinhard et al. The anodic alumina oxidation with a plurality of regular nano-holes is used to be a template for forming hollow polymer nano-tubes. In US published application (20030089899), Lieber et al provide nanometer-scale articles, including nanoscale wires which can be selectively doped at various locations and at various levels. In some cases, the articles may be single crystals. The nanoscale wires can be doped, for example, differentially along their length, or radially, and either in terms of identity of dopant, concentration of dopant, or both. In US published applications (2004/0126305), Chen et al provide methods of fabricating one-dimensional composite nano-fiber on a template membrane with porous array by chemical or physical process. The whole procedures are established under a base concept of "secondary template". First of all, tubular first nano-fibers are grown up in the pores of the template membrane. Next, by using the hollow first nano-fibers as the secondary templates, second nano-fibers are produced therein. Finally, the template membrane is removed to obtain composite nano-fibers. In US published applications (20040013873), Wendorff et al provide porous fibers comprising a polymeric material. The fibers have a diameter of 20 nm to 4000 nm and pores in the form of channels extending at least to the core of said fiber and/or through said fiber. The process for producing the porous fiber comprises electrospinning a 5 to 20% by weight solution of at least one polymer in an organic solvent using an electric field above $10^5$ V/m to obtain a fiber having a diameter of 20 nm to 4000 nm and pores in the form of channels extending at least to the core of said fiber and/or through said fiber. The porous fiber may be used as a carrier for a catalyst, as an adsorbent or absorbent or as a biomaterial, may be chemically modified or functionalized or may be used as a template for producing highly porous solids. In above-mentioned patents, the template with a plurality of nano-holes must be removed by etching after the formation of the nano-tubes or nano-fibers in the nano-holes.

In korea Patent (Pat. No.KR20030084279), Woo Lee et al provide a method of fabricating nano-structures by AAO templates with different sizes of nano-holes or by a twice anodic alumina oxidation template. In this fabricating process, polymer dissolved in an organic solvent fills the nano-holes of the AAO template, and removing the organic solvent after the nano-holes is filled with polymer. After consolidation of polymer in the nano-holes, the template must be removed by etching to reveal nano-structures formed by the nano-holes. During the etching process, the nano-structures would be deformed and lose the shape of the nano-hole.

In Germany Patent (Pat. No. DE10154756) Sawitowski Thomas uses an oxide coating as a template to have an embossing process for forming nano-columns. In this fabricating process, the shape of the nano-columns cannot change with different process conditions, and the nano-columns are too weak to demolding without surface treatment.

BRIEF SUMMARY OF THE INVENTION

The invention provides a modification nano-array comprising a plurality of nano-protrusions formed integrally on a substrate. The nano-protrusion has a concave or convex top surface.

The invention further provides a fabricating method of a nano-array. A template with a plurality of nano-holes is provided. A polymer substrate is embossed by the template, and a plurality of nano-protrusions are revealed by demolding. The nano-protrusions can be further coated with a layer of organic or inorganic coating to enhance scratch resistance, toughness and hydrophile/hydrophobicity, and to reduce the reflectivity of the nano-array or increase the affinity of the surface thereof.

A detailed description is given in the following with reference to the accompanying drawing.

BRIEF DESCRIPTION OF THE DRAWINGS

The invention can be more fully understood by reading the subsequent detailed description and examples with references made to the accompanying drawings, wherein:

FIG. 7b is a top view of FIG. 7a;

FIG. 8b is a top view of FIG. 8a;

DETAILED DESCRIPTION OF INVENTION

The invention provides a controllable embossing process to forming a plurality of nano-protrusions on a thermoplastic polymer substrate instead of melting polymer in an organic solvent, avoiding environmental protection problems and deformed nano-protrusions caused while removing the solvent and demolding.

Figure 1:
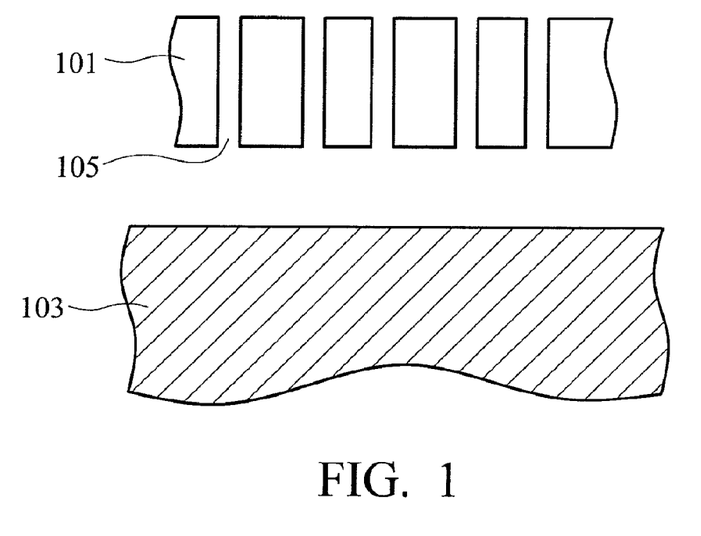
FIG. 1 to FIG. 3 are cross-sectional diagrams of embossing process.
Figure 2:
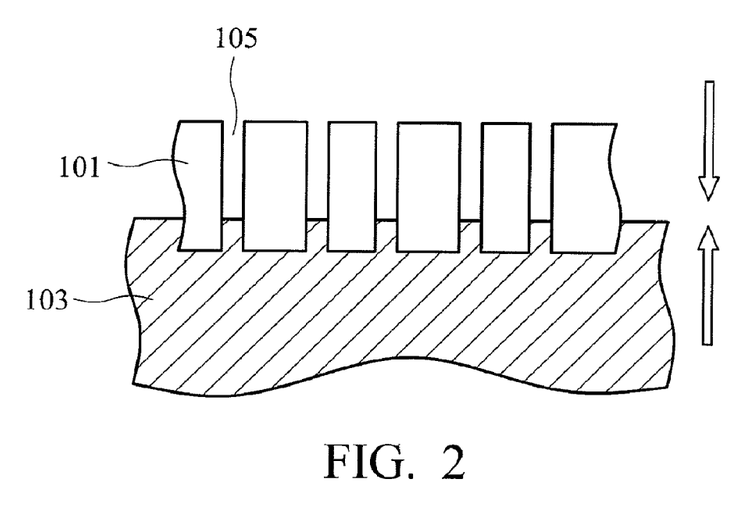
Figure 3:
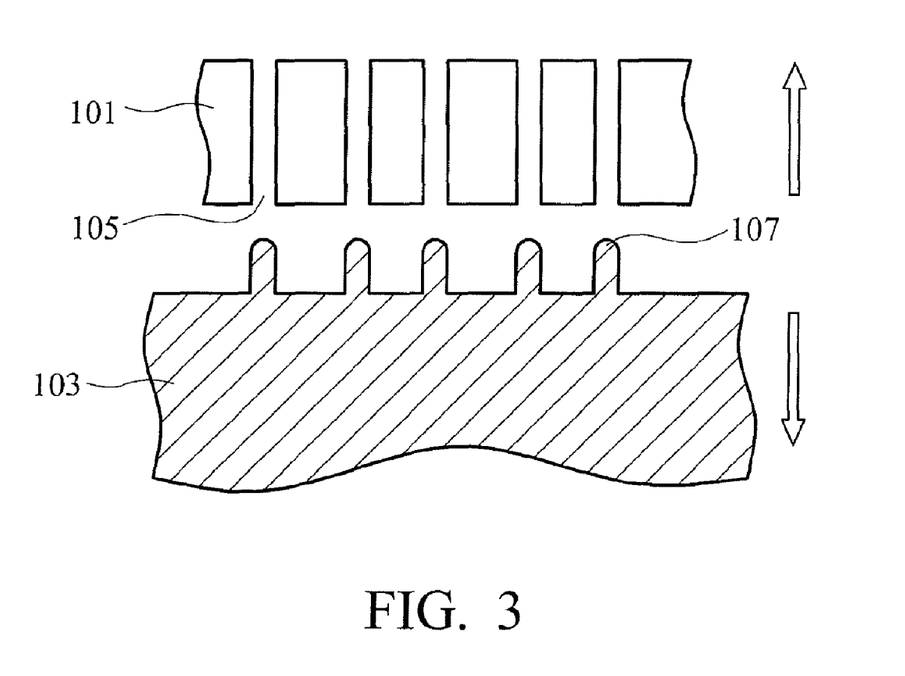

FIG. 1 to FIG. 3 are cross-sectional diagrams of a embossing process of the invention. As shown in FIG. 1, an anodic alumina oxidation template (AAO) 101 with a plurality of nano-holes 105 is fabricated by anodizing an aluminum substrate, and further anodizing again to increase the uniformity of the nano-holes for reducing the difference of diameter between each nano-protrusion formed by the anodic alumina oxidation template 101 in sequent process. The diameter of the nano-holes 105 is less than about 200 nm, preferably between about 20 nm and 150 nm.

As shown in FIG. 2, a polymer substrate 103 is softened by heating. The heating temperature depends on the material of the polymer substrate 103. The polymer substrate 103 comprises thermoplastic polymer, thermoset polymer or UV curing polymer, preferably thermoplastic polymer such as PMMA (polymethyl Methacrylate), PC (polycarbonate), COC (cyclo-olefin copolymers), PP (polypropylene), PE (polyethylene), PVC (polyvinyl chloride), PET (polyethylene terephthalate) or PI (polymide), or thermoset polymer such as PI (polyimide) or Epoxy. As shown in FIG. 2, the polymer substrate 103 is extruded by the AAO template 101. During the extrusion process, the AAO template 101 sinks into the polymer substrate 103 while the polymer substrate 103 is extruded into the nano-holes 105. After the extrusion process, the polymer substrate 103 is cooled to consolidate, and a surfactant is introduced to separate the polymer substrate 103 and anodic alumina oxidation template 101. As shown in FIG. 3, a plurality of nano-protrusions 107 is formed on the polymer substrate 103. The diameter of the nano-protrusions 107 is between about 20 nm and 150 nm. The height of the nano-protrusions 107 is smaller than about 400 nm. The distance between adjacent nano-protrusions is less than about 50 nm. The aspect ratio of the nano-protrusions 107 is smaller than about 3, preferably smaller than about 2.

Still referring to FIG. 3, during demolding process, there is no organic solvent remaining on the polymer substrate 103, thus avoiding environmental protection problem and deformed nano-protrusion caused by organic solvent. The embossing process by using AAO template of the invention costs less than the conventional lithography process per unit process area. The nano-protrusions 107 formed on the shallow portion of the polymer substrate 103 are revealed by demolding through the difference of affinity between the polymer substrate 103 and AAO template 101 instead of removing the template by etching. The top portion of the nano-protrusions 107 can be formed in different shapes by adhesive force on the inner wall of the nano-holes 105, cohesion of polymer as heating and shrink by consolidation.

Figure 5:
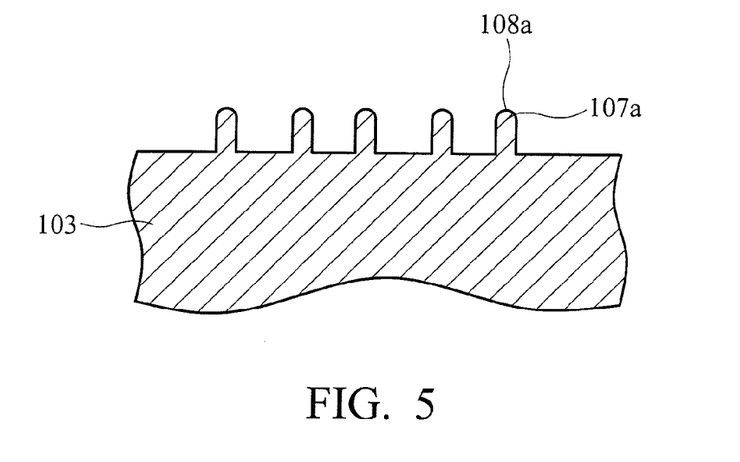
FIG. 5 and FIG. 6 are cross-sectional diagrams of nano-arrays formed by embossing process in different conditions.
Figure 6:
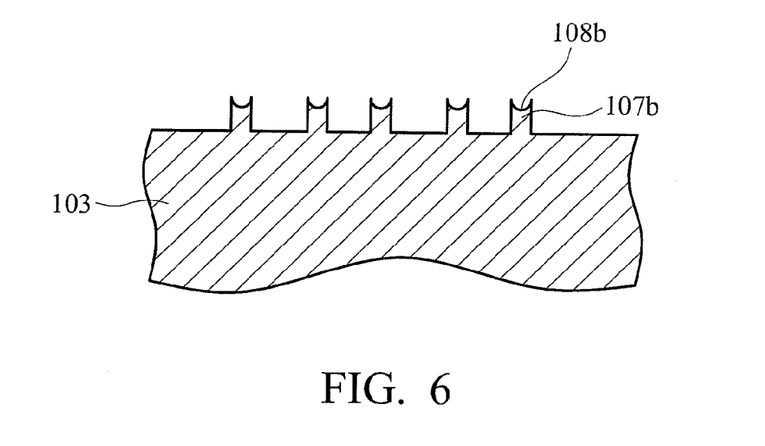

FIG. 5 and FIG. 6 show nano-arrays formed by embossing process of the invention at different conditions. Cyclo-olefin polymer (Tg=130° C.) substrate is embossed by an AAO template having a plurality of nano-holes with a diameter of less than about 100 nm, at conditions of 150° C., vacuum less than 1 atm and pressure less than 5 bar, forming a plurality of nano-protrusions 107a with a convex top surface 108a as shown in FIG. 5. In addition, Cyclo-olefin polymer(Tg=130° C.) substrate is embossed by an AAO template having a plurality of nano-holes with a diameter of between about 100 nm and 200 nm, at conditions of 152° C., vacuum more than 1 atm and pressure less than 5 bar, forming a plurality of nano-protrusion 107b having a concave top surface 108b. The height of the nano-protrusions 107a and 107b are less than 400 nm. The function of the nano-protrusion depends on the shape of the top surface thereof. The nano-protrusions 107 of the invention have high contact angle, hydrophobicity and Van de Waals force due to smaller contact area of the top surface thereof. In addition, the polymer substrate 103 with a plurality of nano-protrusions may be transparent and covered by a coating to reduce the reflectivity in wavelength range of visible light, thus improving the utility rate of light.

Figure 4A:
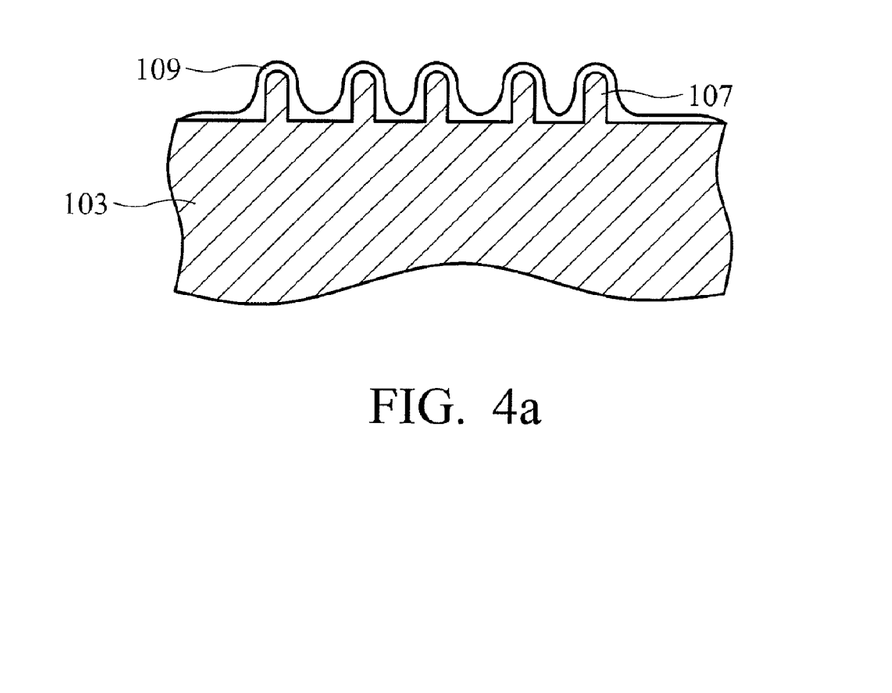
FIG. 4a and FIG. 4b are cross-sectional diagrams of nano-arrays with organic or inorganic coating thereon of the invention.
Figure 4B:
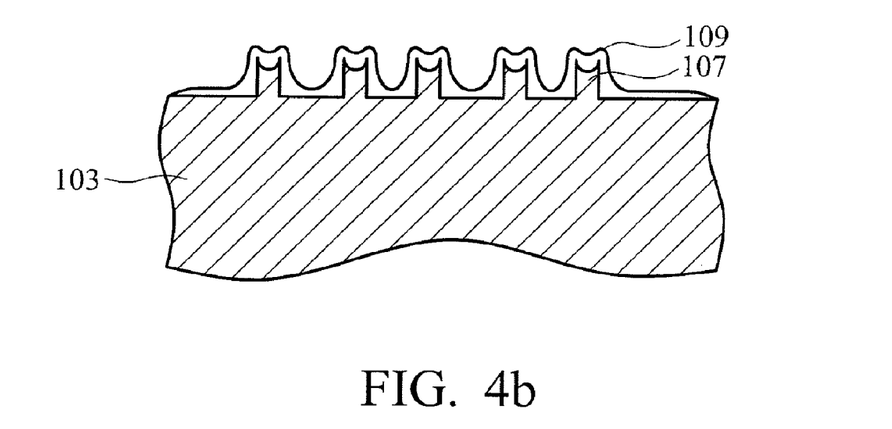

A layer of organic or inorganic coating 109 may be further formed conformally on the nano-protrusions 107 to enhance the strength thereof, as shown in FIG. 4a and FIG. 4b. The thickness of the organic or inorganic coating 107 is less than about 100 nm preferably. The inorganic coating may be metal such as Zr, Ti, Cu, Ag, Au, Al, Ni, W, Fe or Pt, oxide such as SiO2, TiO2 or ITO, GaAs, InGaAs, polysilicon or amorphous silicon. The organic coating may be polysiloxane, silicon, conductive polymer, OLED (organic light emitting diode), PLED (polymer light emitting diode) or PEDOT (polyethylenethioxythiophene) to enhance the toughness of the nano-protrusions 107. The organic or inorganic coating can reveal the strength thereof directly on the nano-protrusions 107, just like a strengthening sugar coating. The organic or inorganic coating has the same shape with the nano-protrusions 107 by conformal formation of coatings on the nano-protrusions.

Figure 7A:
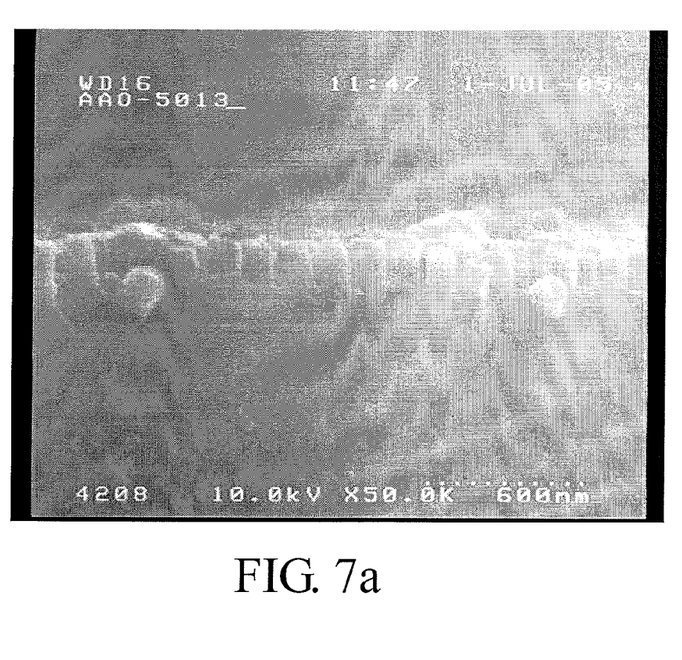
FIG. 7a is a cross-sectional diagram of concave head nano-arrays observed by an electron microscope.
Figure 7B:
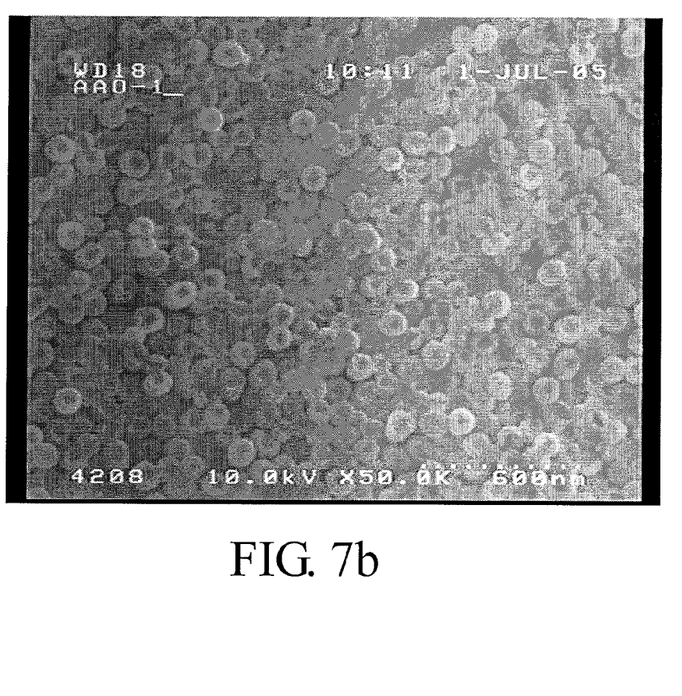

FIG. 7a is a cross-sectional diagram of nano-arrays observed by an electron microscope according to an embodiment of the invention. A transparent thermoplastic polymer substrate is embossed by an AAO template having a plurality of nano-holes with a diameter of less than about 100 nm and an adjacent distance of about 20 nm. During embossing process, the transparent thermoplastic polymer substrate is extruded to fills part of the nano-holes. After embossing process, a plurality of nano-protrusions with aspect ratio of about 2 are revealed on the transparent thermoplastic polymer substrate by demolding, as shown in FIG. 7a. The nano-protrusion has a concave top surface as shown in FIG. 6. FIG. 7b is a top view of the nano-protrusions observed by an electron microscope. As shown in FIG. 7b, the nano-protrusions distribute uniformly.

Figure 8A:
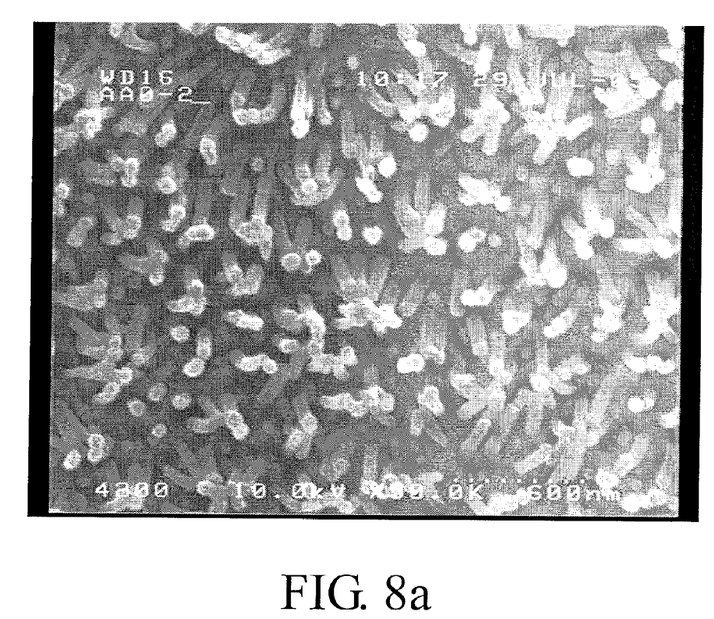
FIG. 8a is a tilt diagram of convex head nano-arrays observed by an electron microscope.
Figure 8B:
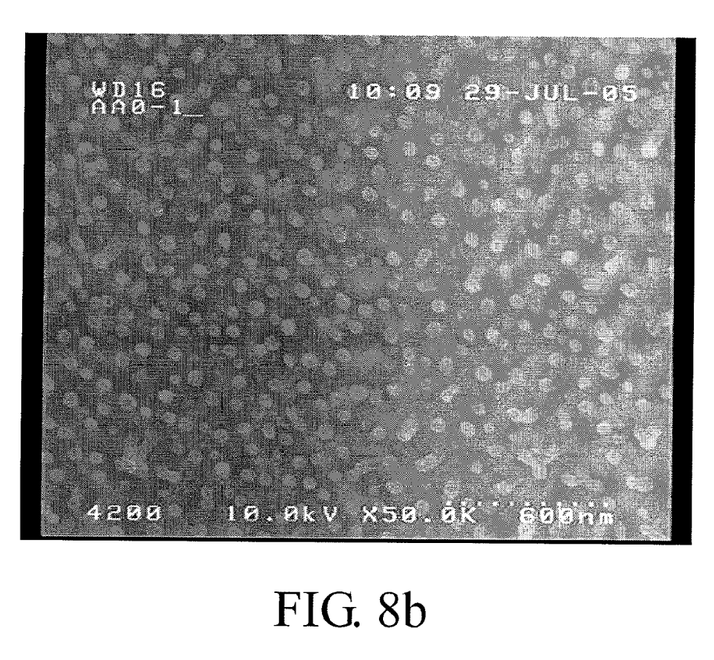

FIG. 8a is a cross-sectional diagram of nano-arrays observed by an electron microscope according to another embodiment of the invention. A transparent thermoplastic polymer is embossed by an AAO template having a plurality of nano-holes with a diameter of about 100 nm and an adjacent distance of about 50 nm. After embossing process, a plurality of nano-protrusions with aspect ratio about 3 are revealed on the transparent thermoplastic polymer substrate by demolding, as shown in FIG. 8a. The nano-protrusion has a convex top surface as shown in FIG. 5. FIG. 8b is a top view of the nano-protrusions. As shown in FIG. 8b, the nano-protrusions distribute uniformly.

Figure 9A:
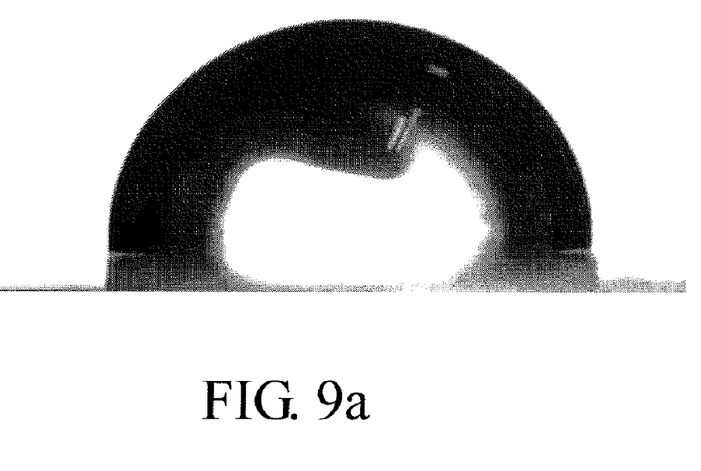
FIG. 9a shows the contact angle between a drop of water and a thermoplastic polymer substrate.
Figure 9B:
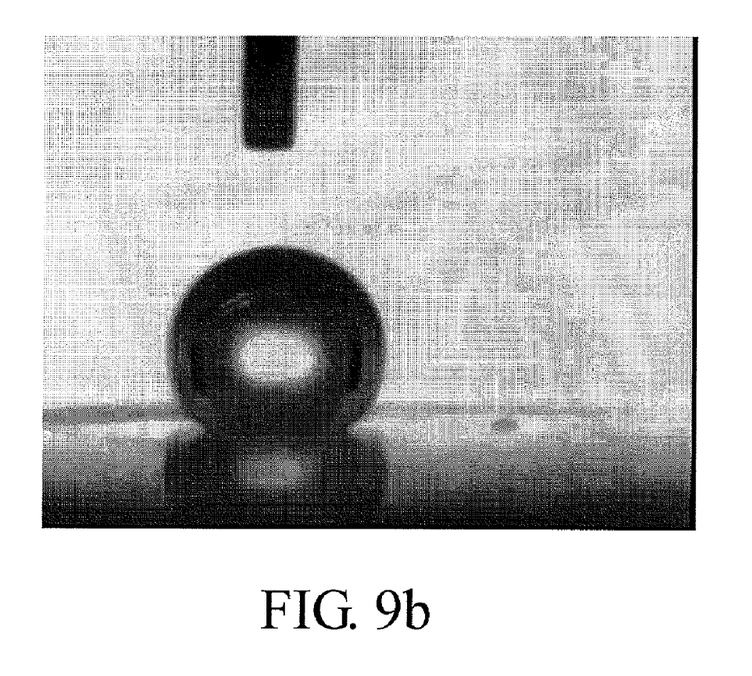
FIG. 9b shows the contact angle between a drop of water and a thermoplastic polymer substrate having a plurality of nano-protrusions thereon formed by embossing process of the invention.

FIG. 9a shows the contact angle between a drop of water and a general thermoplastic polymer substrate. The contact angle therebetween in FIG. 9a is about 90 degrees. FIG. 9b shows the contact angle between a drop of water and a thermoplastic polymer substrate having a plurality of nano-protrusions thereon formed by embossing process of the invention. The contact angle therebetween in FIG. 9b is over 140 degrees. Accordingly, the nano-arrays formed by a template with a plurality of nano-holes exhibit superhydrophobicity as lotus effect.

Figure 10A:
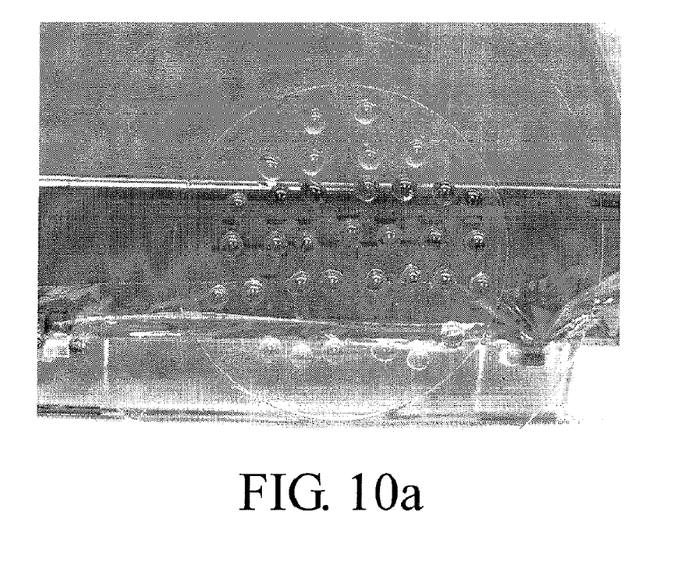
FIG. 10a shows the gecko's effect of the nano-protrusion of the invention.
Figure 10B:
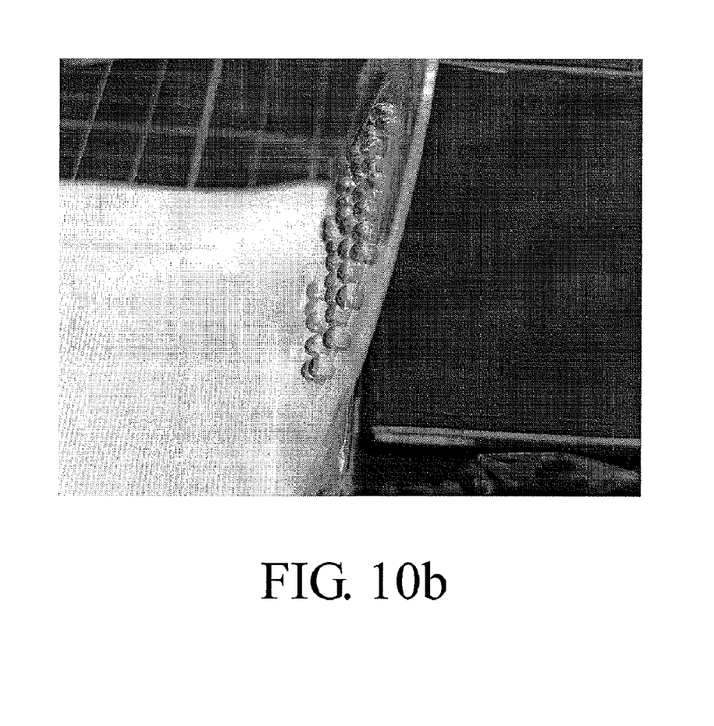
FIG. 10b shows sweat adhering to a surface having a plurality of nano-protrusions.

FIG. 10a shows the gecko's effect of nano-arrays of the invention. As shown in FIG. 10a, a drop of water having a volume of less than about 10 μL, are locked on a substrate having a plurality of nano-protrusions thereon. FIG. 10b shows drops of water adhering to a substrate having a plurality of nano-protrusions thereon.

Figure 11:
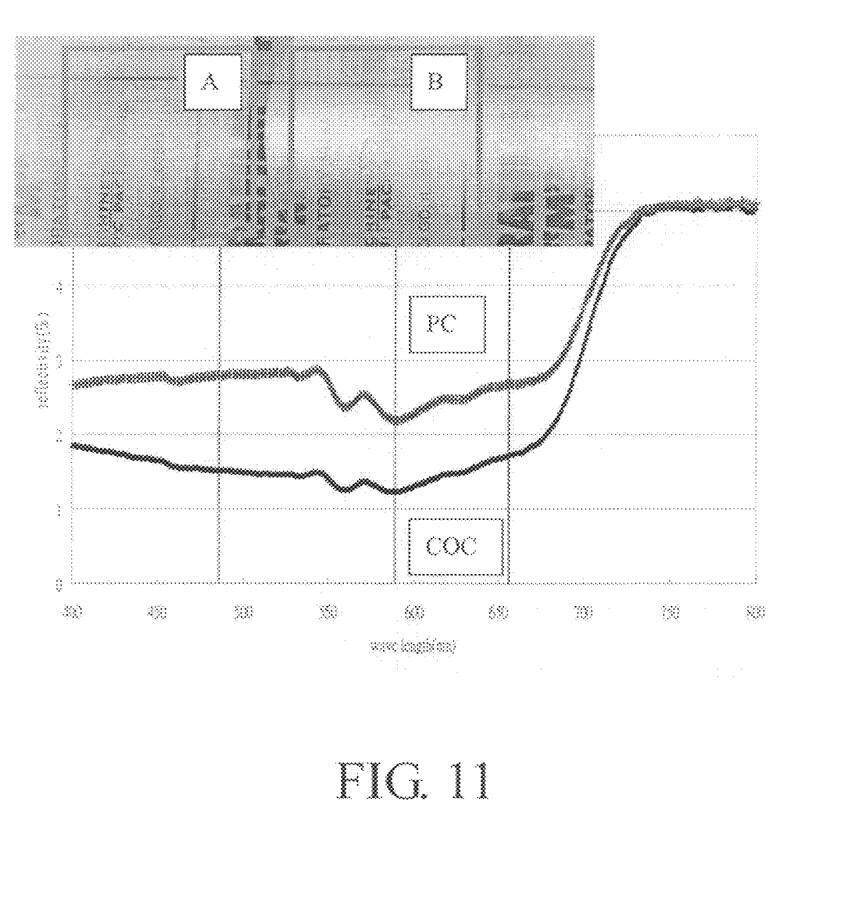
FIG. 11 shows the reflectivity of visible spectrum.

FIG. 11 shows a transparent substrate comprising region A with nano-protrusions of the invention thereon and region B having no nano-protrusions of the invention. As shown in FIG. 11, the reflective brightness of light in region A is lower than in region B. The transparent substrate in FIG. 11 may be PC (Polycarbonate) or COC (Cyclo Olefin Copolymers). For PC, region A has a reflectivity of about 2-3 between visible light wavelength of about 400-700 nm. For COC, region A has a reflectivity of about 1-2 between visible light wavelength of about 400-700 nm. The reflectivity of region A for different substrate materials is similar. It is known that the nano-array of the invention can reduce glare and reflection without inducing color-shift.

Figure 12A:
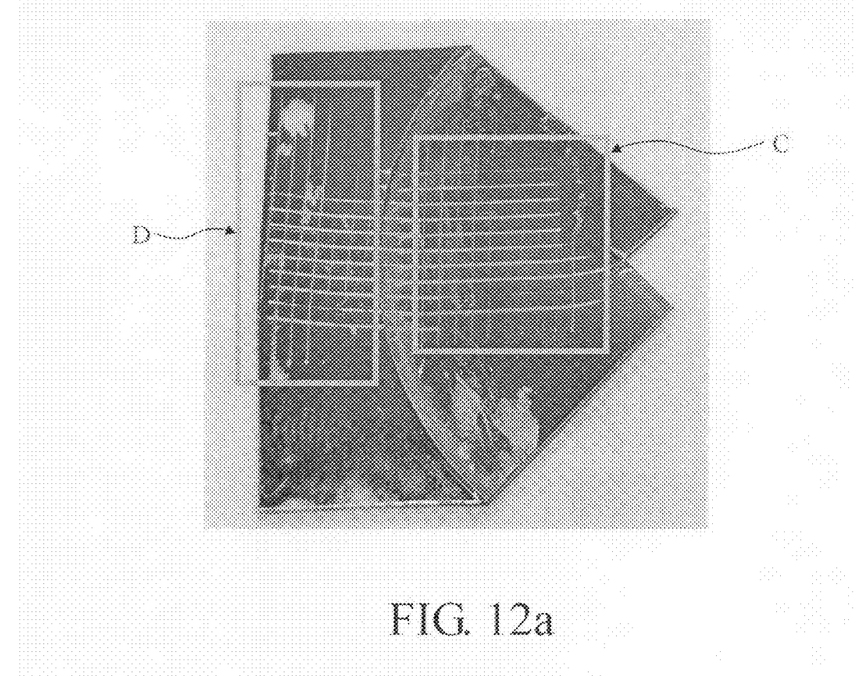
FIG. 12a shows the adhesion test result of 100 nm thick Au sputtered on a polymer substrate with and without nano-protrusions.
Figure 12B:
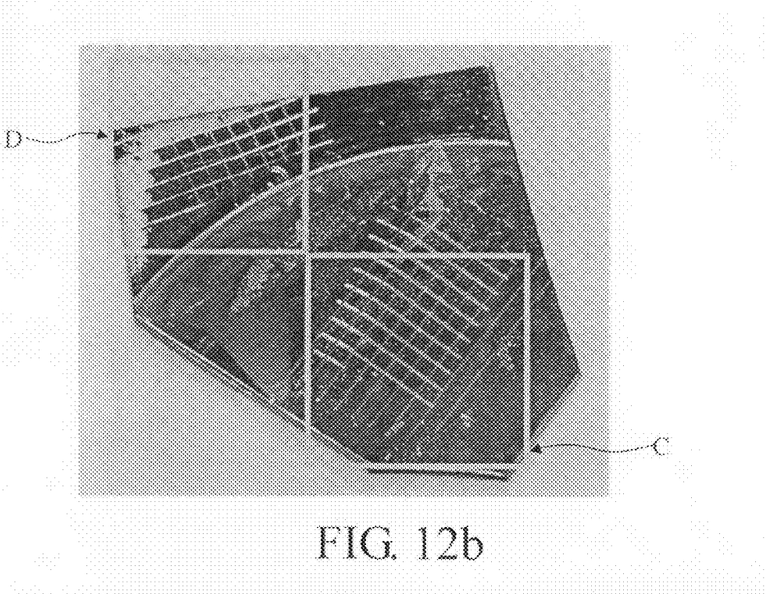
FIG. 12b shows the adhesion test result of 200 nm thick Au sputtered on a polymer substrate with and without nano-protrusions.

Experimental study indicates that the nano-protrusions substantially increase the adhesion between a polymer substrate and an overlying coating. FIGS. 12a and 12b respectively show the adhesion test results of 100 nm and 200 nm-thick Au coatings on PC polymer substrates. The adhesion test was carried out using crosshatch adhesion test, where a grid of 100 squares was cut into the coated substrate, and a 3M tape was applied over the grid, and then rapidly peeled away. The number of squares remaining on the substrate gives a relative percentage value of adhesion. As shown in FIGS. 12a and 12b, regions C with nano-protrusions passed the adhesion test, while regions D without nano-protrusions failed. Note that the nano-protrusions can be used to improve adhesion of any organic or inorganic coatings, such as Si, Au; Cu, or the like. Further, polymer substrates other than the PC substrate (COC substrates, for example) may be used to practice the invention.

Table 1 shows transmission of a thermoplastic polymer substrate having a plurality of nano-protrusions thereon formed by embossing process of the invention. The reflectivity of general transparent thermoplastic polymer substrate, such as plastic, measured by Hazemeter is under 3.5%. As shown in Table 1, nano-protrusions formed by embossing process of the invention can increase the reflectivity of the general transparent polymer substrate to 94%.

TABLE 1

|  | transmission |
|---|---|
| conventional thermoplastic polymer | 92.51 |
| thermoplastic polymer substrate having | 94.18 |

TABLE 1-continued

|  | transmission |
|---|---|
| a plurality of nano-protrusions thermoplastic polymer substrate having a plurality of nano-protrusions | 93.65 |

Finally, while the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of fabricating a nano-array, comprising:
   providing a template with a plurality of nano-holes;
   embossing a polymer substrate by the template to integrally form a plurality of nano-protrusions thereon; and
   demolding to reveal the nano-protrusion,
   wherein the nano-protrusion has a concave top surface by embossing the polymer substrate by the template at vacuum more than 1 atm to partially fill the nano-holes or has a convex top surface by embossing the polymer substrate by the template at vacuum less than 1 atm to completely fill the nano-holes.

2. The method of fabricating a nano-array as claimed in claim 1, further comprising introducing a surfactant for demolding.

3. The method of fabricating a nano-array as claimed in claim 1, the template is formed by anodizing aluminum once or twice.

4. The method of fabricating a nano-array as claimed in claim 1, further comprising forming an organic or inorganic coating conformally on the polymer substrate and the nano-protrusions.

5. The method of fabricating a nano-array as claimed in claim 4, wherein the organic coating comprises polysiloxane, silicon, conductive polymer, OLED (organic light emitting diode), PLED (polymer light emitting diode) or PEDOT (polyethylenethioxythiophene).

6. The method of fabricating a nano-array as claimed in claim 4, wherein the inorganic coating comprises Zr, Ti, Cu, Ag, Au, Al, Ni, W, Fe, Pt, $SiO_2$, $TiO_2$, ITO, GaAs, InGaAs, polysilicon or amorphous silicon.

7. The method of fabricating a nano-array as claimed in claim 4, wherein the thickness of the organic and inorganic coatings is smaller than 100 nm.

8. The method of fabricating a nano-array as claimed in claim 1, wherein the polymer substrate comprises thermoplastic polymer, thermoset polymer or UV curing polymer.

9. The method of fabricating a nano-array as claimed in claim 8, wherein the thermoplastic polymer comprises PMMA (polymethyl methacrylate), PC (polycarbonate), COC (cyclo-Olefin copolymers), PP (polypropylene), PE (polyethylene), PVC (polyvinyl chloride), PET (polyethylene terephthalate) LCP (liquid crystal polymer) or TPI (thermoplastic polyimide), thermoset polymer comprises PI (polyimide), Epoxy.

10. The method of fabricating a nano-array as claimed in claim 8, wherein the thermoset polymer comprises PI (polyimide) or Epoxy.

* * * * *